Aug. 2, 1960  H. K. HAZEL  2,947,447
COMPONENT FEED AND INSERTION
Filed April 10, 1956  2 Sheets-Sheet 1

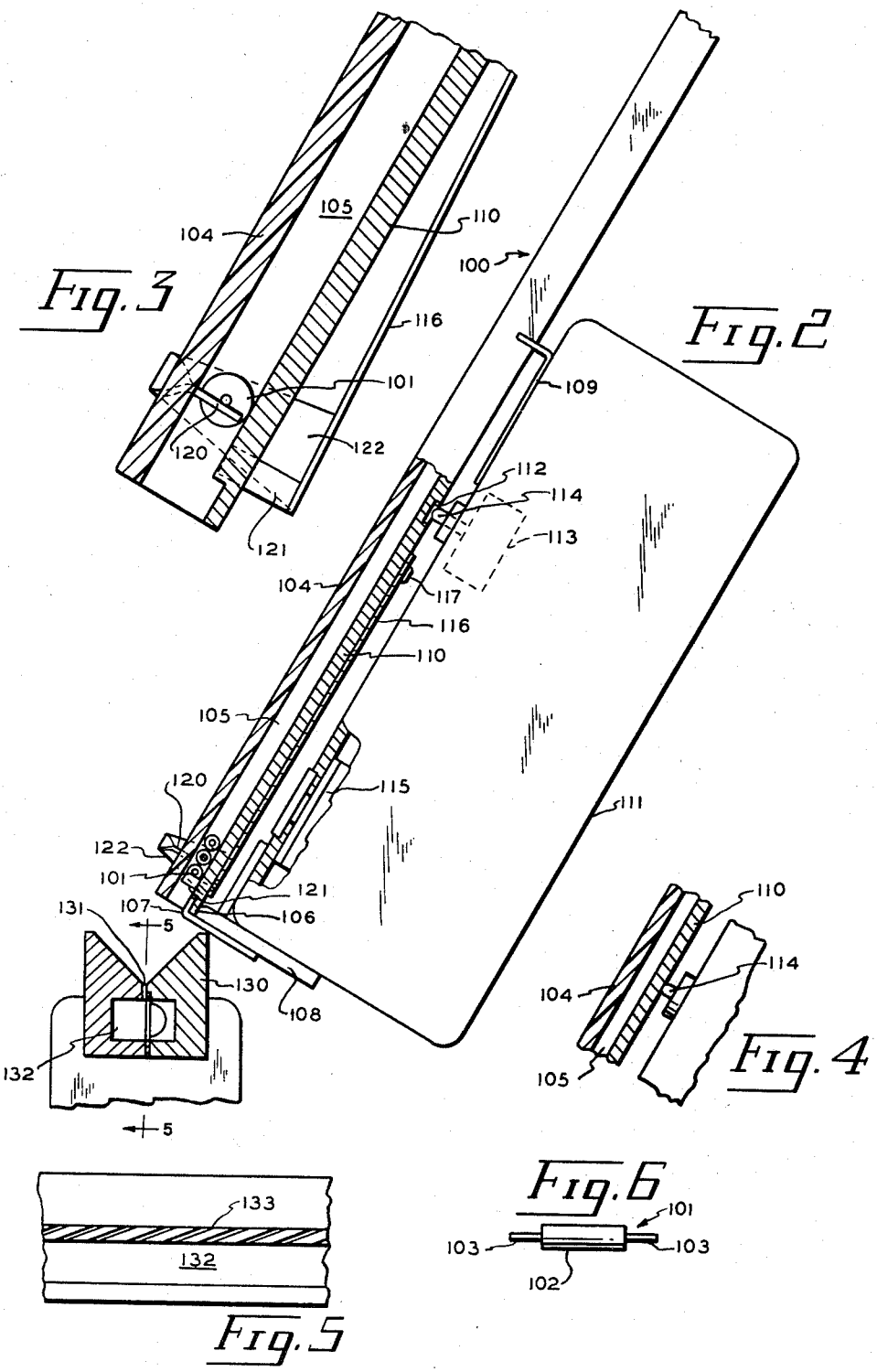

United States Patent Office 2,947,447
Patented Aug. 2, 1960

2,947,447

COMPONENT FEED AND INSERTION

Herbert K. Hazel, Arlington, Va., assignor to Melpar, Inc., Alexandria, Va., a corporation of New York Filed Apr. 10, 1956, Ser. No. 577,329

2 Claims. (Cl. 221—299)

This application is related in subject matter, to applications for United States patent, as follows:

Lawson et al., Serial No. 413,092 filed March 1, 1954 for Stapling Machine, now Patent No. 2,904,785, September 22, 1959.

Lawson et al., Serial No. 413,072 filed March 1, 1954 for Modular Circuitry, now abandoned.

Hazel et al., Serial No. 493,392 filed March 10, 1955 for Stapling Machines, now Patent No. 2,904,786, September 22, 1959.

Vossen, Serial No. 473,251 filed December 6, 1954 for Automatic Machinery, now Patent No. 2,868,413, January 13, 1959.

Hazel, Serial No. 513,782 filed June 7, 1955 for Stapling Machines, now Patent No. 2,778,691, January 22, 1957.

This application is also related to the following applications for United States patent, filed concurrently herewith, as follows:

Vossen et al. for Automation, Serial No. 577,330, now Patent No. 2,911,646, November 10, 1959.

Vossen for Wafer Feed and Insertion, Serial No. 577,328.

It is an object of the present invention to provide a novel hopper for electrical components, including feed devices for feeding the components from the hopper one at a time.

The above and still further objects, features and advantages of the present invention will become apparent upon consideration of the following detailed description of one specific embodiment thereof, especially when taken in conjunction with the accompanying drawings, wherein:

Figure 2 is a view in transverse section, taken on the line 2—2 of Figure 1;

Figure 3 is an enlarged view of a portion of Figure 2, showing an alternate position of a wafer dispensing gate;

Figure 4 is a partial sectional view showing a switch actuator, actuated by a component hopper;

Figure 5 is a partial view in longitudinal section taken through a pneumatic component conveyor as indicated by line 5—5 of Figure 2.

Figure 6 is a view in elevation of an electrical component, specifically a resistor.

Figure 1:
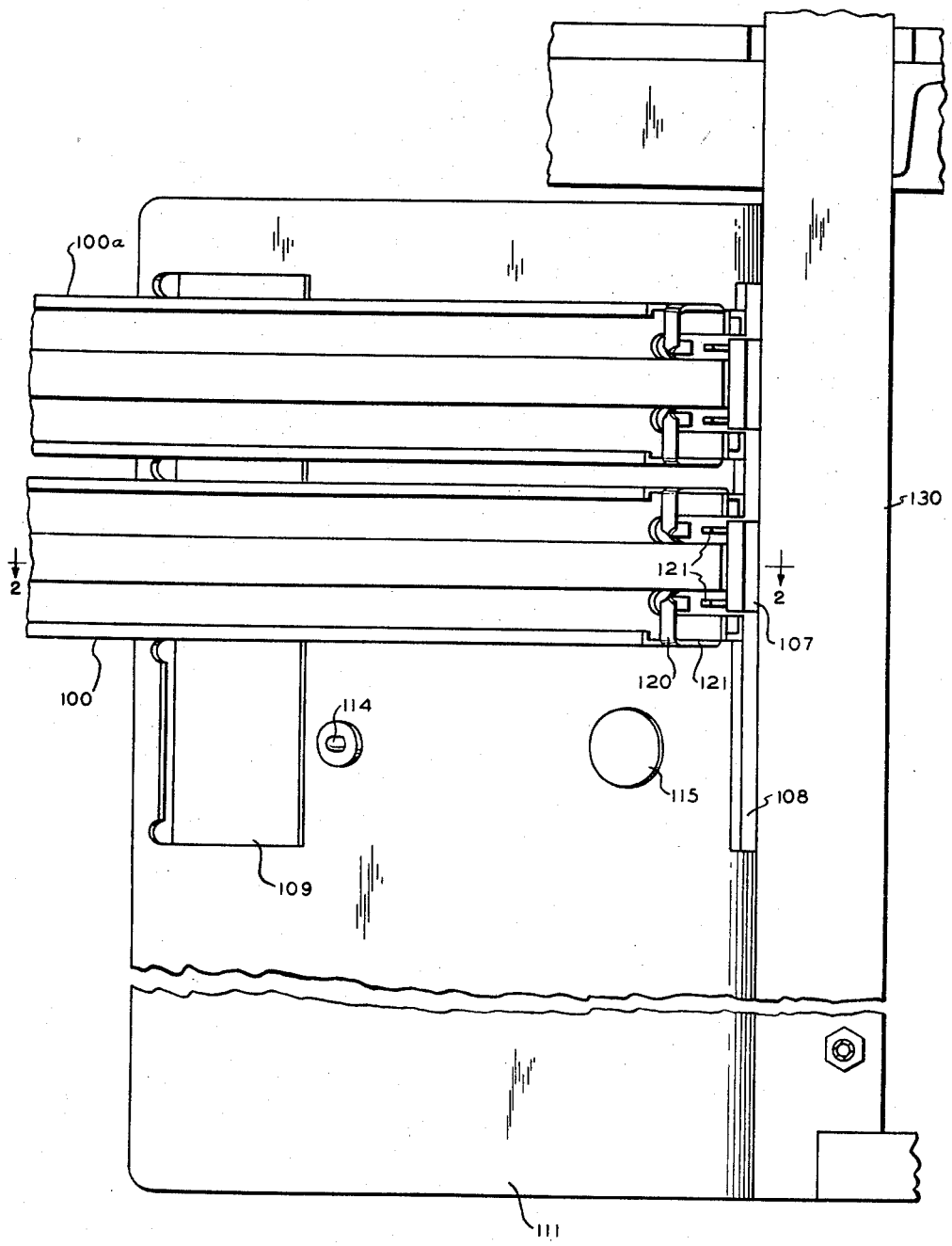
Figure 1 is a view in front elevation of component dispensing devices, and of a pneumatic conveyor for components.

Referring now more particularly to Figures 1-6 of the accompanying drawings, the reference numeral 100 denotes a hopper for components 101. In Figure 6 a typical component, 101, is illustrated in the form of an electrical resistor of the ½ watt or ¼ watt size. The component 101 includes a relatively fragile cylindrical body 102, and a pair of wire leads 103 extending axially from either end thereof.

The hopper 100 is preferably fabricated of aluminum, or other non-magnetic metal, except for a transparent face plate 104, and includes a channel 105 dimensioned in thickness and width to accept a large number of superposed components 101. The hopper 100 is oriented to permit the components to fall by gravity, but is preferably not vertical, rather making an angle of about 60° to the horizontal.

The lower end of each hopper 100 includes a lip 106, which interlocks within a similar supporting lip 107 which is secured to a supporting plate 108.

The hopper 100 is supported at a relatively elevated point by a bracket 109, which maintains the rearward wall 110 of the hopper in predetermined spaced relation with respect to an aluminum container 111.

In the exterior of wall 110 may be provided a recess 112. The hoppers 100 are employed in multiple, and certain of the hoppers include recesses 112, while others do not. The hoppers are adapted to hold two different component sizes. Components of one size are always stored in hoppers which include recesses 112, and those of the other size are always stored in hoppers which do not include recesses 112. Positioned immediately under each recess position, and secured within container 111, is a switch 113. An actuator 114 for switch 113 protrude through a wall of container 111. If actuator 114 finds a recess (Figure 2) it is not depressed. If not, (Figure 4) it is depressed by wall 110. Accordingly, circuits are differentially prepared in accordance with the character of the components in the hopper, to signal the character of the components. The circuits are utilized, in manner described in the above referred to applications for U.S. patent, to condition a stapling and forming head to handle the specific component types, taking account of differences in character of the latter.

Components are released from the hopper 100 in response to energization of an electromagnet 115. To this end, an armature 116 is secured at its upper end, by means of a rivet 117, or the like, to the outside surface of wall 110. The armature 116 is fabricated of thin resilient steel strip, and normally lies flat against wall 110. When electromagnet 115 is energized the steel strip armature 116 is attracted to the electromagnet. When the latter is de-energized the armature returns to its unactuated position, in response to its own resilience.

The armature 116 includes two sets of perpendicular fingers 120 and 121, the latter pair extending directly from the lower end of armature 116 into the channel 105 in the direction of panel 104, while the former pair is secured to supports 122, extending from armature 116, and extend rearwardly into channel 105 toward wall 110.

The fingers 121 lie beneath the fingers 120, and parallel thereto. The pairs of fingers, extending in opposite directions, have ends subsisting in a common line, at least approximately, and are each sufficiently long to extend completely across the thickness of channel 105. The fingers 121 lie beneath the fingers 120 by a distance appreciably greater than the thickness of leads 103. The spacing between fingers of each pair allows these to support the leads 103.

As the armature 116 passes to either extreme limit of its motion, the fingers 120, 121 extend in succession into the channel 105. As the fingers 120 recede, the component which is supported on the fingers 120 drops to the fingers 121. As the fingers 121 recede the component on the fingers 121 drops out of the hopper. Hence, each energization of electromagnet 115 results in delivery of one and only one component.

The components drop from the several hoppers 100, 100a, etc., which extend in a single line, into a V-shaped channel 130, extending parallel to and under the hopper outlets. The components lie, when dropped, in the bottom, 131, of the V-shaped channel 130. An air conduit 132 is provided from which extend a large number of ports, 133, into the base 131 of the V-shaped channel. The several ports 133 slope upwardly, in the direction of desired travel of the components. The latter are blown along the base of the channel by air blasts produced by ports 133 in response to air under pressure continuously supplied to conduit 132.

While I have described and illustrated one specific embodiment of the present invention, it will become apparent that variations of the specific details of construction may be resorted to without departing from the true spirit and scope of the invention as defined in the appended claims.

The claimed subject matter is as follows:

1. A gravity feed hopper for a plurality of stacked electrical components, said hopper having a channel, said channel having a vertical component of extension and arranged to store said components in superposition of one another, each of said components including a relatively thick body and relatively thin leads extending in opposite directions from said body, said hopper having a gate, said gate including two pairs of fingers, said pairs of fingers extending in opposite directions with respect to said channel, one of said pairs of fingers positioned and arranged to support the lowest component, and the other of said pair of fingers arranged to support the second lowest component in said hopper, and means for actuating said fingers one into and the other out of said channel simultaneously, wherein is provided a solenoid and an armature for said solenoid, said solenoid and armature included in said means for actuating said fingers, wherein said hopper is fabricated of non-magnetic material, wherein said armature is a magnetic resilient strip secured at one end directly to said hopper, and wherein said fingers are integral with said armature adjacent the other end thereof.

2. In combination, a hopper fabricated of non-magnetic material, said hopper including a channel arranged to stack objects in superposition internally of said channel, means including a pair of fingers extending in opposite directions toward said channel and located at different levels of said channel, said fingers arranged when actuated to extend in alternation one internally of said hopper and the other externally of said hopper, an armature consisting of a sheet of resilient magnetic material secured adjacent one end thereof to said hopper and normally lying flat against said hopper, said fingers secured to said armature adjacent the other end of said armature, wherein is further provided a solenoid, and means locating said solenoid in actuating relation to said armature.

References Cited in the file of this patent

UNITED STATES PATENTS

| | | |
|---|---|---|
| 403,843 | Junkins | May 21, 1889 |
| 673,591 | Aldrich | May 7, 1901 |
| 712,962 | Price | Nov. 4, 1902 |
| 1,165,700 | Muessel | Dec. 28, 1915 |
| 1,518,208 | McClellan | Dec. 9, 1924 |
| 1,551,525 | Hamer | Jan. 15, 1925 |
| 1,698,955 | Lutfring | Jan. 15, 1929 |
| 1,841,217 | Seizer | Jan. 12, 1932 |
| 1,916,074 | Roskin | June 27, 1933 |
| 2,036,970 | Porter | Apr. 7, 1936 |
| 2,071,771 | Shield | Feb. 23, 1937 |
| 2,254,814 | Angel | Sept. 2, 1941 |
| 2,304,455 | Guerard | Dec. 8, 1942 |
| 2,338,714 | Garner | Jan. 11, 1944 |
| 2,512,573 | Walters | June 20, 1950 |
| 2,534,140 | Moore | Dec. 12, 1950 |
| 2,684,783 | Ahlstrom | July 27, 1954 |
| 2,715,731 | Pugel | Aug. 23, 1955 |
| 2,746,041 | Heeley | May 22, 1956 |
| 2,748,388 | Cardani | June 5, 1956 |
| 2,773,658 | Van Otteren et al. | Dec. 11, 1956 |

FOREIGN PATENTS

| | | |
|---|---|---|
| 209,335 | Germany | Apr. 29, 1909 |
| 266,686 | Germany | Oct. 29, 1913 |
| 498,892 | Great Britain | Jan. 16, 1939 |